(12) United States Patent
Suzuki

(10) Patent No.: US 9,779,326 B2
(45) Date of Patent: Oct. 3, 2017

(54) MOVING IMAGE RECOGNITION APPARATUS AND MOVING IMAGE RECOGNITION METHOD

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Tomohisa Suzuki, Kanagawa (JP)

(73) Assignees: KABUSHIKI KAISHA TOSHIBA, Tokyo (JP); TOSHIBA SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 14/667,757

(22) Filed: Mar. 25, 2015

(65) Prior Publication Data

US 2015/0199589 A1    Jul. 16, 2015

Related U.S. Application Data

(63) Continuation of application No. PCT/JP2012/074729, filed on Sep. 26, 2012.

(51) Int. Cl.
*G06K 9/60* (2006.01)
*G06K 9/00* (2006.01)
(Continued)

(52) U.S. Cl.
CPC ............ *G06K 9/60* (2013.01); *G06K 9/00711* (2013.01); *G06K 9/18* (2013.01); *G06K 9/183* (2013.01); *G06K 9/74* (2013.01); *G06K 2209/25* (2013.01)

(58) Field of Classification Search
CPC ............ G06K 9/60; G06K 9/74; G06K 9/183; G06Q 10/087; G06Q 20/203; G06Q 30/02; G06Q 20/208
(Continued)

(56) References Cited

U.S. PATENT DOCUMENTS

2009/0250516 A1  10/2009  Tsuchiya et al.
2010/0104194 A1   4/2010  Suzuki
2012/0104098 A1   5/2012  Matsuda

FOREIGN PATENT DOCUMENTS

CN      101556723      10/2009
CN      102456123       5/2012
(Continued)

OTHER PUBLICATIONS

International Preliminary Report on Patentability for International Application No. PCT/JP2012/074729 Dated Apr. 9, 2015, 8 pages.
(Continued)

*Primary Examiner* — Ruiping Li
(74) *Attorney, Agent, or Firm* — Amin, Turocy & Watson LLP

(57) ABSTRACT

According to an embodiment, a moving image recognition apparatus includes a moving object detection unit, a data code reading unit, a label recognition unit, an association unit, and an output unit. The moving object detection unit detects moving objects from a moving image stored in a buffer unit and identifies each of the moving objects. The data code reading unit detects a data code from each frame of the moving image and decodes the detected data code. The label recognition unit detects and recognizes a label from each frame of the moving image. When the recognized label and the decoded data code exist on the same object, the association unit associates them. The output unit outputs together the decoding result of the data code and the recognition result of the label associated with the decoding result.

7 Claims, 9 Drawing Sheets

(51) Int. Cl.
      *G06K 9/18*     (2006.01)
      *G06K 9/74*     (2006.01)

(58) Field of Classification Search
      USPC ........................................................ 382/181
      See application file for complete search history.

(56) References Cited

FOREIGN PATENT DOCUMENTS

| | | |
|---|---|---|
| JP | 2004-127013 | 4/2004 |
| JP | 2004-185418 | 7/2004 |
| JP | 2004-287806 | 10/2004 |
| JP | 2008-033640 | 2/2008 |
| JP | 2009-271916 | 11/2009 |
| JP | 2010-108135 | 5/2010 |
| JP | 2010-113729 | 5/2010 |
| JP | 2011-164934 | 8/2011 |
| JP | 2011-248917 | 12/2011 |
| JP | 2012-053712 | 3/2012 |
| JP | 2012-119005 | 6/2012 |
| JP | 2013-012156 | 1/2013 |
| JP | 2013-012157 | 1/2013 |

OTHER PUBLICATIONS

Chinese Office Action for Chinese Patent Application No. 201280076054.5 mailed on Feb. 1, 2016.
Japanese Office Action for Japanese Patent Application No. 2014-223709 mailed on Sep. 8, 2015.
Chinese Office Action for Chinese Patent Application No. 201280076054.5 mailed on Oct. 9, 2016.

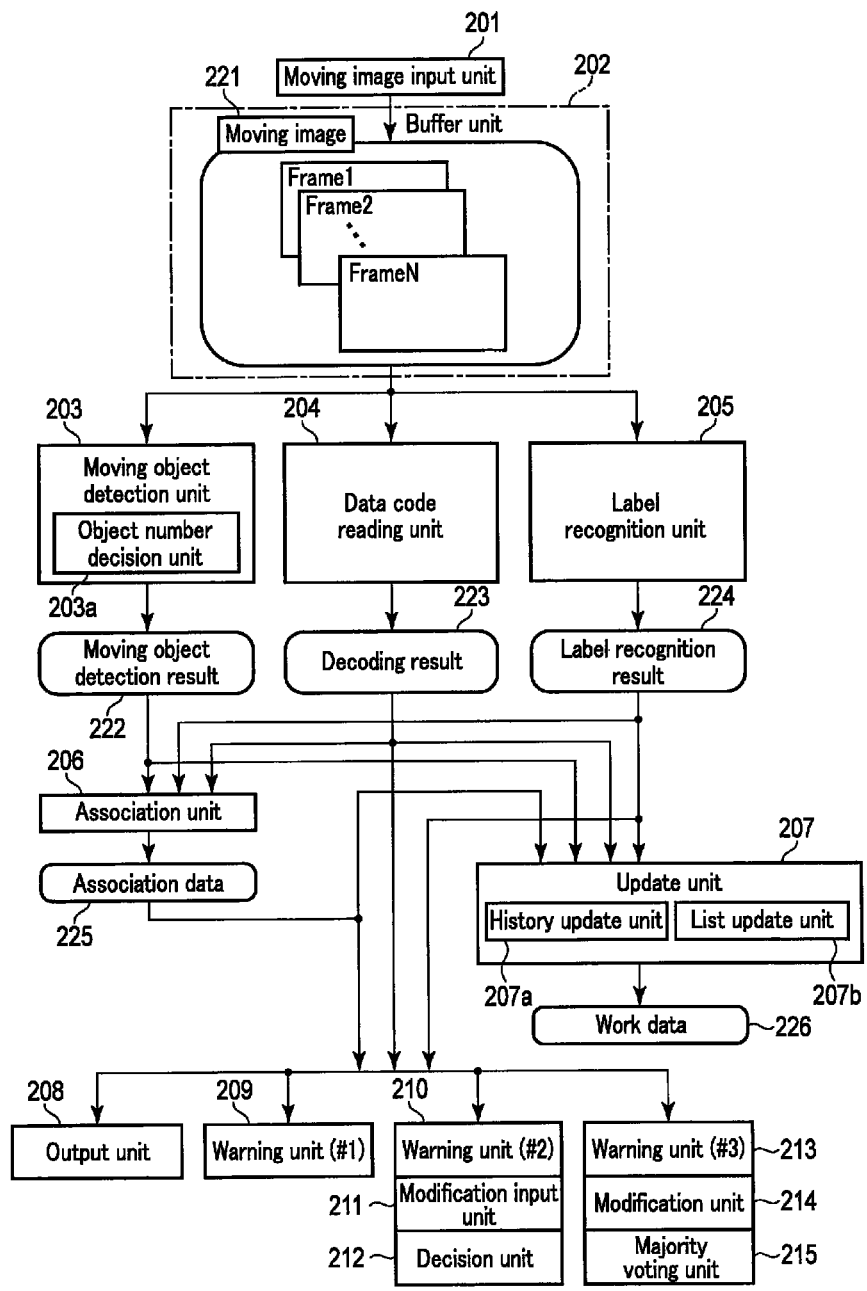
F I G. 2

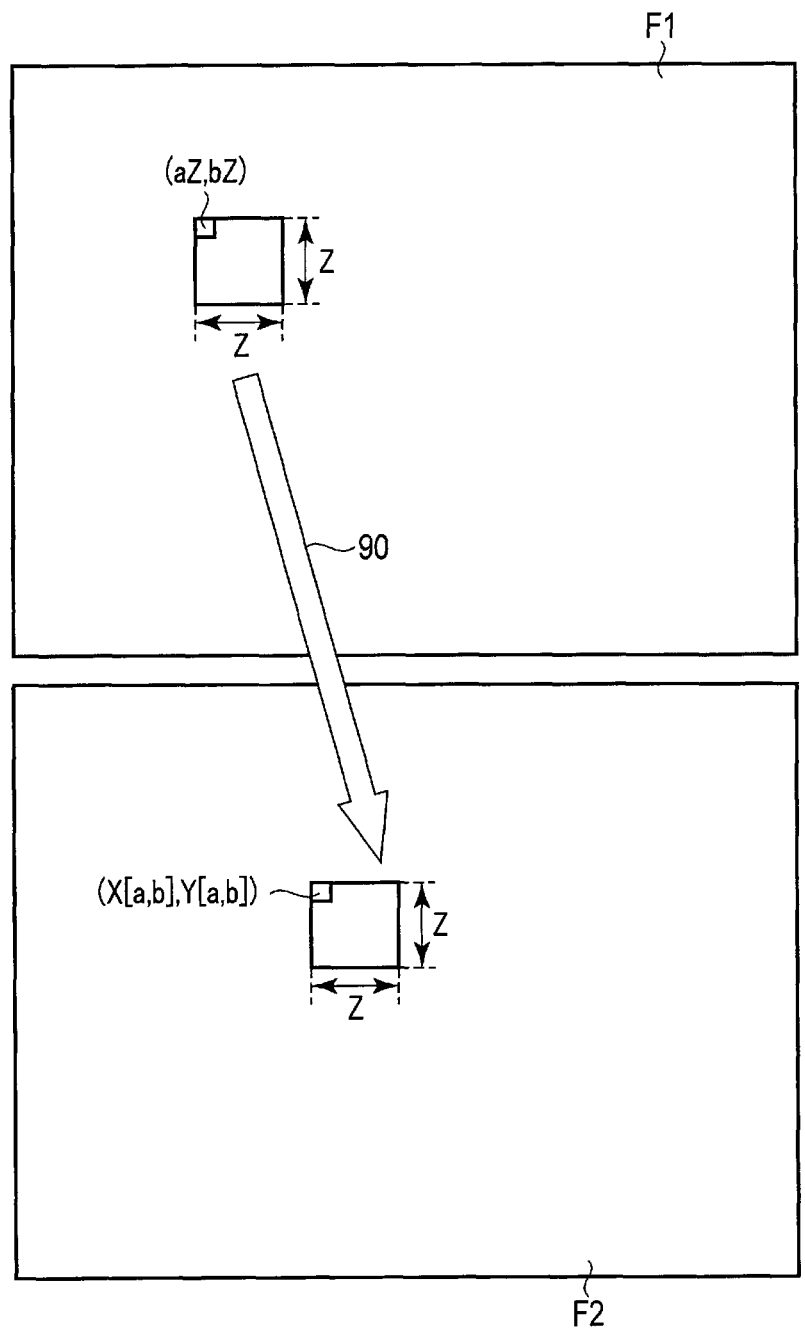
F I G. 9

| Image | Type | Price reduction amount, discount rate, or number of points |
|---|---|---|
| −¥10 | 1 | 10 |
| −¥20 | 1 | 20 |
| ⋮ | ⋮ | ⋮ |
| 20% off | 2 | 2 |
| 30% off | 2 | 3 |
| ⋮ | ⋮ | ⋮ |
| 10pt | 3 | 10 |
| 50pt | 3 | 50 |
| ⋮ | ⋮ | ⋮ |

FIG. 10

```
BARCODE=012345678
```

F I G. 11

```
BARCODE=012345678
LABEL=1,10
```

F I G. 12

```
LABEL_INPUT_REQUEST
OBJECT=1
```

F I G. 13

```
LABEL_INPUT_RESULT
OBJECT=1
LABEL=1,10
```

F I G. 14

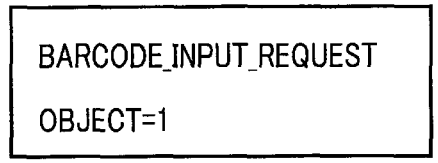
F I G. 15
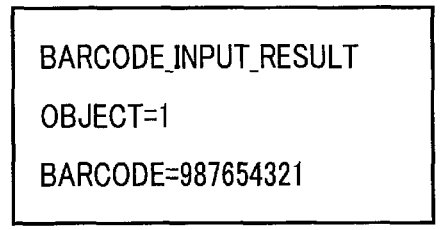
F I G. 16

MOVING IMAGE RECOGNITION APPARATUS AND MOVING IMAGE RECOGNITION METHOD

CROSS-REFERENCE TO RELATED APPLICATIONS

This application is a Continuation application of PCT application No. PCT/JP2012/074729, filed on Sep. 26, 2012, the entire contents of which are incorporated herein by reference.

FIELD

Embodiments described herein relate generally to a moving image recognition apparatus and moving image recognition method for recognizing a data code and a label such as a discount label in an input moving image in association with each other.

BACKGROUND

A point-of-sales (POS) system is known as a system that processes a data code (for example, a barcode) printed on merchandise. The POS system is generally used in a retail store such as a supermarket. Based on a product code obtained by reading (decoding) a data code printed on each piece of merchandise purchased by a customer, the POS system acquires the unit price of the merchandise that is registered in the POS system, and calculates the total amount.

Pieces of merchandise dealt in a retail store sometimes include merchandise to which, for example, a label displaying a price reduction amount (to be referred to as a discount label hereinafter) is attached. The POS system needs to efficiently perform price reduction of discount label-attached merchandise. Recently, there is provided a technique meeting this demand. This technique utilizes an image acquired by capturing the surface of merchandise on which a data code is printed. That is, according to this technique, when a data code and a discount label are detected from the same acquired image, the decoding result of the data code and the recognition result of the discount label are output together.

According to a POS system to which this technique (to be referred to as a related art hereinafter) is applied, when the recognition result of a label is output together with the decoding result of a data code, the unit price can be automatically reduced by a price reduction amount printed on the discount label. That is, the price reduction operation can be performed without requiring an operation by the operator. Even when a discount label displaying a discount rate, or a point giving label displaying the number of points to be given is used instead of the discount label, the POS system can process such a label in the same way.

In the above-described related art, a label such as a discount label needs to be attached to a surface on which the label can be captured at the same time as the data code of merchandise. If the label is attached to a surface on which the label cannot be captured at the same time as the data code of merchandise, the label is not included in an image acquired by capturing the data code. For example, when a data code is printed on the front side (first surface) of a milk carton and a label is attached to the back side (second surface different from the first surface) of the milk carton, both the data code and label cannot be included in the same image. When a label is attached to merchandise in a layout in which the label is not included in the same image together with the data code of the merchandise, it is difficult for the related art to associate the data code and the label. If the association fails, it is hard to correctly perform price reduction (or discount or point giving).

It is an object of the present invention to provide a moving image recognition apparatus and moving image recognition method capable of associating a data code and a label from a moving image even when the data code and the label are arranged on different surfaces of the same object.

BRIEF DESCRIPTION OF THE DRAWINGS

FIG. 2 is a block diagram mainly showing the functional arrangement of the moving image recognition apparatus.

FIG. 9 is a view showing the state of block matching applied in this embodiment.

FIG. 10 is a table schematically showing the typical data structure of a label dictionary applied in this embodiment.

FIG. 11 is a view showing an example of an output content when there is no label associated with a barcode.

FIG. 12 is a view showing an example of an output content when there is a label associated with a barcode.

FIG. 13 is a view showing an example of the first request message to prompt input of a modified label recognition result.

FIG. 14 is a view showing an example of the first response message corresponding to the first request message.

FIG. 15 is a view showing an example of the second request message to prompt input of a modified decoding result.

FIG. 16 is a view showing an example of the second response message corresponding to the second request message.

DETAILED DESCRIPTION

In general, according to an embodiment, a moving image recognition apparatus includes a moving image input unit, a buffer unit, a moving object detection unit, a data code reading unit, a label recognition unit, an association unit, and an output unit. The moving image input unit inputs a moving image. The buffer unit stores the input moving image. The moving object detection unit detects moving objects from the moving image stored in the buffer unit and identifies each of the moving objects. The data code reading unit detects a data code such as a barcode or two-dimensional barcode from each frame of the moving image, and decodes the detected data code. The label recognition unit detects a label from each frame of the moving image, and recognizes a symbol printed on the detected label. When the recognized label and the decoded data code exist on a single moving object among the identified moving objects, the association unit associates a recognition result of the label with a decoding result of the data code. The output unit outputs together the decoding result of the data code and the recognition result of the label associated with the decoding result.

An embodiment will now be described with reference to the accompanying drawings.

Figure 1:
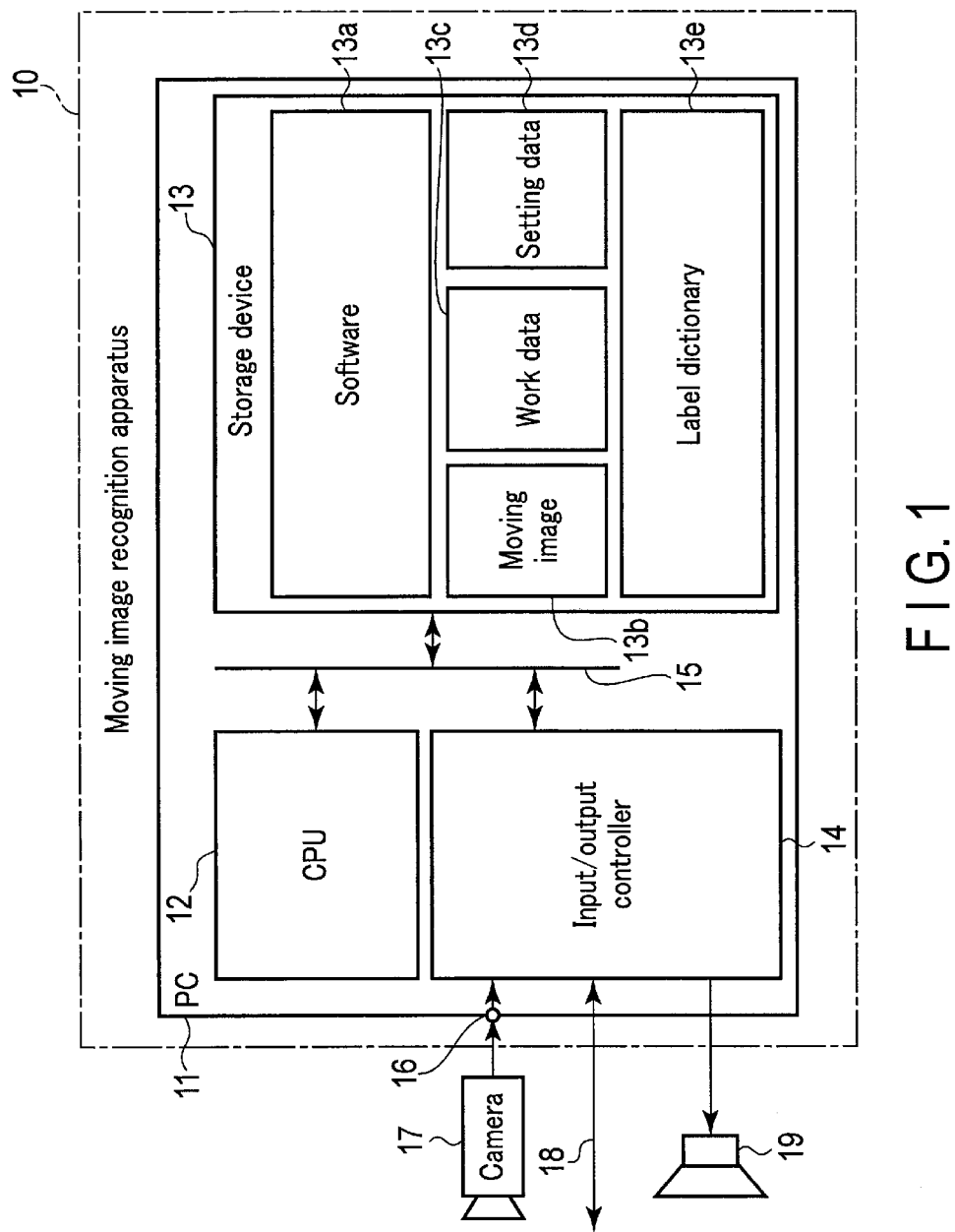
FIG. 1 is a block diagram showing the typical hardware arrangement of a moving image recognition apparatus according to an embodiment.

FIG. 1 is a block diagram showing the typical hardware arrangement of a moving image recognition apparatus 10 according to the embodiment. In the embodiment, the moving image recognition apparatus 10 operates as one element of the POS system. The moving image recognition apparatus 10 is implemented using, e.g., a personal computer (PC) 11. The PC 11 includes a CPU 12, a storage device 13, an input/output controller 14, and a system bus 15. The CPU 12, the storage device 13, and the input/output controller 14 are interconnected by the system bus 15. The PC 11 also includes a video terminal 16.

The CPU 12 executes information processing including detection of a moving object, reading (decoding) of a data code, and recognition of a label. This embodiment assumes that the data code is a barcode (one-dimensional barcode). The moving object is, e.g., merchandise. To detect the merchandise as a moving object, the following operation is requested of, e.g., the operator of a POS terminal in the POS system. For this operation, the operator holds the merchandise and moves it to the image capturing range of a camera 17 to be described later (i.e., directs the merchandise toward the camera 17). Note that a customer himself performs the above-described operation in the case of a self-checkout.

In general, merchandise has a barcode surface on which a barcode is printed. The barcode surface on which a barcode is printed indicates not only a surface of merchandise on which a barcode is printed, but also a surface of merchandise to which a barcode sticker is placed. A barcode is printed on the barcode sticker. In some cases, a label such as a discount label, discount label, or point giving label is placed on the merchandise. The discount label displays a price reduction amount, the discount label displays a discount rate, and the point giving label displays the number of points to be given.

The storage device 13 is constituted by a RAM unit, a ROM unit, and a flash memory unit. The RAM unit is constituted using at least one RAM, the ROM unit is constituted using at least one ROM, and the flash memory unit is constituted using at least one flash memory (i.e., a rewritable nonvolatile memory).

The storage device 13 includes a software area 13a, a moving image area 13b, a work data area 13c, a setting data area 13d, and a label dictionary area 13e. The software area 13a is ensured in, e.g., the ROM unit. The moving image area 13b and the work data area 13c are ensured in, e.g., the RAM unit. The setting data area 13d and the label dictionary area 13e are ensured in, e.g., the flash memory unit. The storage areas of the ROM unit, RAM unit, and flash memory unit are allocated in the same address space recognized by the CPU 12. The CPU 12 accesses the software area 13a, the moving image area 13b, the work data area 13c, the setting data area 13d, and the label dictionary area 13e in accordance with an application purpose without awareness of the ROM unit, the RAM unit, or the flash memory unit.

The software area 13a is used to store software for the information processing. This software includes instruction codes, constants, various tables, and the initial values of variables. The moving image area 13b is used to store a moving image. The moving image is input via, e.g., the video terminal 16 and the input/output controller 14.

The work data area 13c is used to store work data for the information processing. The work data include the decoding result of a barcode and the recognition result of a label. The setting data area 13d is used to store setting data to be described later. The label dictionary area 13e is used to store a label dictionary to be described later.

The input/output controller 14 is connected to an image capturing apparatus that acquires a moving image, e.g., the camera 17 via the video terminal 16. The input/output controller 14 inputs a moving image acquired by the camera 17 and transfers the moving image to the storage device 13 by, e.g., direct memory access (DMA). The input/output controller 14 is also connected to the POS terminal via an input/output interface, e.g., a serial input/output interface 18. The input/output controller 14 outputs the processing result of the moving image recognition apparatus 10 via the serial input/output interface 18 under the control of the CPU 12 (software executed by the CPU 12). The processing result of the moving image recognition apparatus 10 includes the decoding result of a barcode, and the recognition result and region detection result of a label. The input/output controller 14 also inputs data (e.g., modification data) transferred from the POS terminal via the serial input/output interface 18. The input/output controller 14 is further connected to a loudspeaker 19. The input/output controller 14 outputs a message or warning tone from the loudspeaker 19.

FIG. 2 is a block diagram mainly showing the functional arrangement of the moving image recognition apparatus 10. This functional arrangement is assumed to be implemented by executing the software by the CPU 12 of the PC 11 shown in FIG. 1. The moving image recognition apparatus 10 includes a moving image input unit 201, a buffer unit 202, a moving object detection unit 203, a data code reading unit 204, a label recognition unit 205, an association unit 206, an update unit 207, an output unit 208, a warning unit (first warning unit) 209 (#1), a warning unit (second warning unit) 210 (#2), a modification input unit 211, a decision unit 212, a warning unit (third warning unit) 213 (#3), a modification unit 214, and a majority voting unit 215. In this embodiment, of the elements 201 to 215, those excluding the buffer unit 202 are constituted by software modules. However, some or all of these software modules may be replaced with hardware modules. The buffer unit 202 is constituted using the moving image area 13b of the storage device 13.

The moving image input unit 201 inputs a moving image 221 transferred by the input/output controller 14. The buffer unit 202 is used to store the moving image 221. More specifically, the buffer unit 202 is used to temporarily store N successive frames out of the frames of the moving image 221 in the time series order. The moving object detection unit 203 detects moving objects from the moving image 221 and identifies the respective moving objects. Accordingly, the moving object detection unit 203 acquires a moving object detection result 222. The moving object detection unit 203 includes an object number decision unit 203a. The object number decision unit 203a decides a number for identifying a detected moving object.

The data code reading unit 204 detects a data code from each frame of the moving image 221 and decodes the data code. This embodiment assumes that a data code to be detected and decoded by the data code reading unit 204 is a barcode. Therefore, the data code reading unit 204 according to this embodiment detects a barcode from each frame of the moving image 221 and decodes the barcode. That is, the data code reading unit 204 reads a barcode from each frame of the moving image 221. As a result, the data code reading unit 204 acquires a decoding result 223 of the barcode.

The label recognition unit 205 detects a label from each frame of the moving image 221, and recognizes a symbol printed (e.g., printed) on the label. Accordingly, the label recognition unit 205 acquires a label recognition result 224. The label recognition result 224 includes a type (label type) representing a discount label, a discount label, or a point giving label as a label, and a price reduction amount, a discount rate, or the number of points.

The association unit 206 determines, based on the moving object detection result 222, whether a label recognized by the label recognition result 224 and a barcode decoded by the data code reading unit 204 exist on the same object. This determination method will be described later. When the label and the barcode exist on the same object, the association unit 206 associates the label recognition result 224 corresponding to the label with the decoding result 223 corresponding to the barcode. As a result, the association unit 206 acquires association data 225 that associates the label recognition result 224 with the decoding result 223.

The update unit 207 includes a history update unit 207a and a list update unit 207b. Every time association by the association unit 206 is completed, the history update unit 207a updates some of work data 226. The work data 226 will be described later. Every time association by the association unit 206 is completed, the list update unit 207b updates an array Λ of the list of the decoding result 223 of a barcode, and an array Γ of the list of the label recognition result 224. The arrays Λ and Γ will be described later.

The output unit 208 outputs together the decoding result 223 of the barcode, and the label recognition result 224 associated with the decoding result 223. Based on the decoding result 223, the label recognition result 224, and the association data 225, the warning unit 209 determines whether the first warning condition has been established. The first warning condition represents a state in which a label has been detected on a moving object detected by the moving object detection unit 203, but a barcode on the moving object ceases to be detected by the time the moving object ceases to be detected. When the moving object that has been detected by the moving object detection unit 203 ceases to be detected, the warning unit 209 determines whether the first warning condition has been established. If the first warning condition has been established, the warning unit 209 generates a message or warning tone via the input/output controller 14.

Based on the label recognition result 224 and the association data 225, the warning unit 210 determines whether the second warning condition has been established. If the second warning condition has been established, the warning unit 210 generates a message or warning tone via the input/output controller 14. The second warning condition represents a state in which the label recognition unit 205 has detected labels different in the recognition result (i.e., the different label recognition results 224) for a single moving object among moving objects detected by the moving object detection unit 203.

If the second warning condition has been established, the modification input unit 211 requests the operator of the POS terminal to input a modified label recognition result. If the second warning condition has been established, the decision unit 212 decides by a majority voting the label type, and a price reduction amount, a discount rate, or the number of points.

Based on the decoding result 223 and the association data 225, the warning unit 213 determines whether the third warning condition has been established. If the third warning condition has been established, the warning unit 213 generates a message or warning tone via the input/output controller 14. The third warning condition represents a state in which the data code reading unit 204 has detected barcodes different in the decoding result 223 (i.e., the different decoding results 223) for a single moving object among moving objects detected by the moving object detection unit 203.

If the third warning condition has been established, the modification unit 214 requests the operator of the POS terminal to modify the decoding result (decoding content). When the third warning condition has been established, the majority voting unit 215 selects the decoding result 223 by majority voting.

Next, an operation according to this embodiment will be explained. First, the operator of the POS terminal takes merchandise purchased by the customer out of, e.g., a shopping cart, and moves the merchandise to the image capturing range of the camera 17. The camera 17 acquires a moving image of target objects within the image capturing range, including the merchandise (i.e., a moving object). The operator directs the merchandise to the camera 17 so that the camera 17 captures a barcode printed on the barcode surface of the merchandise and a label attached to the merchandise. If the label is attached to a surface different from the barcode surface, the operator properly changes the direction of the merchandise to the camera 17 so that the barcode surface and the label sequentially fall in the image capturing range of the camera 17.

The input/output controller 14 receives the moving image acquired by the camera 17 via the video terminal 16. The input/output controller 14 transfers the received moving image to the storage device 13 by, e.g., DMA. The moving image input unit 201 controls the input/output controller 14 so that the moving image transferred by the input/output controller 14 is stored frame by frame in the buffer unit 202 within the moving image area 13b.

Figure 3:
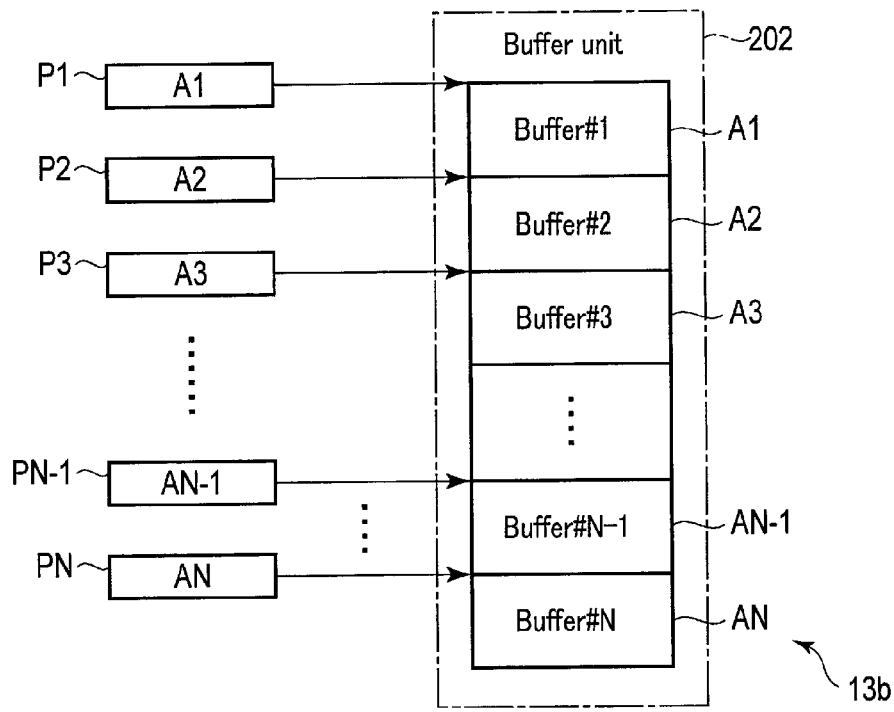
FIG. 3 is a view showing an example of the correspondence between N pointers and N buffers in a moving image area shown in FIG. 1.

FIG. 3 shows an example of the moving image area 13b shown in FIG. 1. The buffer unit 202 is ensured in the moving image area 13b. The buffer unit 202 is constituted by N buffers (frame buffers) A1, A2, A3, . . . , AN−1, and AN. The buffers A1 to AN are used to temporarily store N successive frames out of the frames of the moving image. Thus, the buffers A1 to AN are used as a ring buffer.

The areas of N pointers P1, P2, P3, . . . , PN−1, and PN are also ensured in the moving image area 13b. The pointer P1 points the position (for example, start address) of a buffer in which the latest frame of a moving image is stored. The pointer P2 points the position of a buffer in which a frame preceding the latest frame by one frame is stored. Similarly, the pointer PN−1 points the position of a buffer in which a frame preceding the latest frame by N−1 frames is stored. The pointer PN points the position of a buffer in which a frame being loaded now is stored.

In this manner, FIG. 3 shows the correspondence between the pointers P1 to PN and the buffers A1 to AN in the moving image area 13b. The moving image input unit 201 updates the pointers P1 to PN. Note that the pointers P1 to PN may be stored in a storage area other than the moving image area 13b, e.g., in the work data area 13c.

Assume that the pointer P1 points the buffer Ai (i is one of 1 to N). At this time, the pointer P2 points Ai+1 MOD N. Note that x MOD y represents a remainder obtained by dividing x by y.

The moving image input unit 201 updates the pointers P1 to PN every time input of a moving image is completed for one frame. The moving image input unit 201 is notified of the completion of an input frame by an interrupt from the input/output controller 14 that is triggered by a vertical sync signal obtained through the video terminal 16. In every interrupt from the input/output controller 14, the moving image input unit 201 updates the pointers P1 to PN. Also, every time the pointers P1 to PN are updated, the moving image input unit 201 makes a setting for DMA transfer by the input/output controller 14. That is, the moving image input unit 201 causes the input/output controller 14 to DMA-transfer only one frame of a moving image input via the video terminal 16 to a buffer pointed by the pointer PN. In addition, every time the pointers P1 to PN are updated, the moving image input unit 201 generates a thread for performing frame processing to be described later, and causes the CPU 12 to execute the thread.

In updating of the pointers P1 to PN, the pointer Pj is updated according to the following rule for each of 1 to N. Assuming that the number of a buffer pointed by the pointer Pj is i (assuming that the pointer Pj points the buffer Ai), the number of the buffer after updating is i+1 MOD N. Note that x MOD y represents a remainder obtained by dividing x by y.

Figure 4:
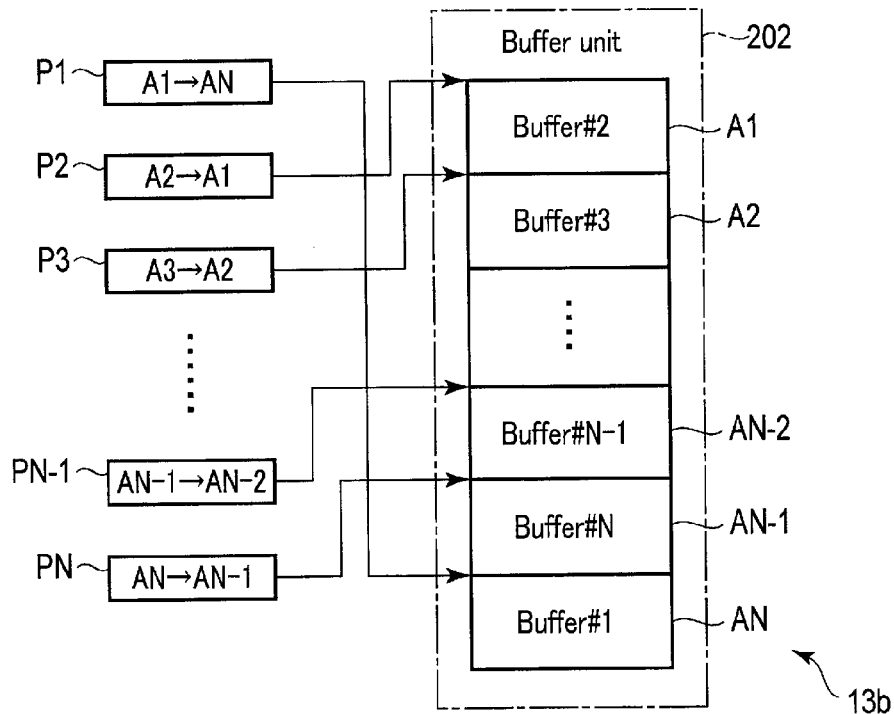
FIG. 4 is a view showing an example of the correspondence between the N pointers and the N buffers in the moving image area one frame after the state of FIG. 3.

A concrete example of the relationship between the pointers P1 to PN and the buffers A1 to AN will be explained with reference to FIGS. 3 and 4. FIG. 3 shows an example of the correspondence between the pointers P1 to PN and the buffers A1 to AN in a state in which the buffer AN is used to store a frame being loaded now, as is apparent from the above description. FIG. 4 shows an example of the correspondence between the pointers P1 to PN and the buffers A1 to AN one frame after the state of FIG. 3.

In the example of FIG. 3, the pointer P1 points the buffer A1, the pointer P2 points the buffer A2, and the pointer P3 points the buffer A3. Similarly, the pointer PN−1 points the buffer AN−1, and the pointer PN points the buffer AN. At this time, the buffer AN pointed by the pointer PN is used to store a frame being loaded now. Assume that the loading of the frame to the buffer AN is completed.

In this case, the moving image input unit 201 updates the pointer P1 from an address indicating the buffer A1 to an address indicating the buffer AN, as shown in FIG. 4. The updated pointer P1 represents that the buffer AN (i.e., the buffer AN in which loading was completed immediately before) is a buffer that stores the latest frame. The moving image input unit 201 updates the pointer P2 from an address indicating the buffer A2 to an address indicating the buffer A1, and updates the pointer P3 from an address indicating the buffer A3 to an address indicating the buffer A2. Although not shown in FIG. 4, the moving image input unit 201 similarly updates the pointers P4 to PN−2 to addresses indicating the buffers A3 to AN−3, respectively. Also, the moving image input unit 201 updates the pointer PN−1 from an address indicating the buffer AN−1 to an address indicating the buffer AN−2, and updates the pointer PN from an address indicating the buffer AN to an address indicating the buffer AN−1. Thus, the buffer AN−1 is used to load a new frame. The buffer AN−1 is a buffer that has stored the oldest frame upon completion of loading a frame to the buffer AF.

By the above-described updating of the pointers P1 to PN, frames stored in the buffers A1 to AN−2 become frames preceding the latest frame loaded in the buffer AN by one frame to N−2 frames, respectively. In this embodiment, the buffers A1 to AN are used in order like a ring, and temporally successive frames are stored in the buffer unit 202 starting from a buffer pointed by the pointer P1 updated in response to input of a frame. That is, the buffers A1 to AN are used as a ring buffer.

Figure 5:
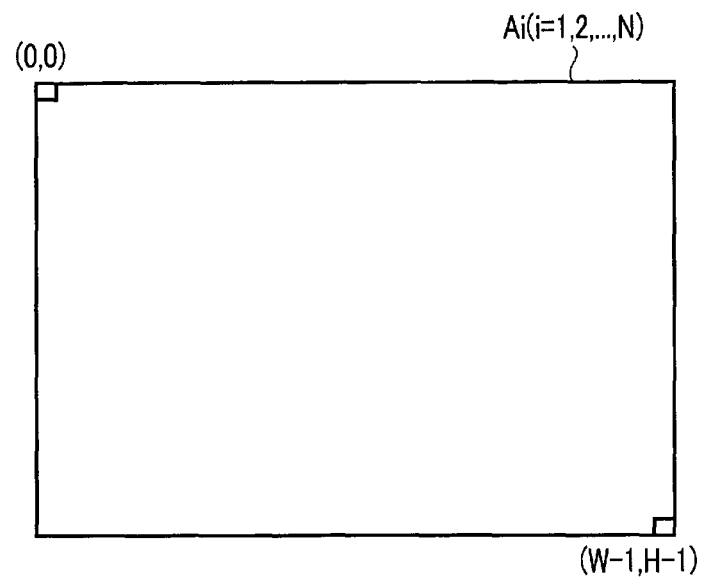
FIG. 5 is a view showing an example of the size of a buffer that stores a frame of a moving image, and a coordinate system in the buffer.

FIG. 5 shows an example of the size of the buffer Ai (i=1, 2, . . . , N) that stores a frame (i.e., frame image) of a moving image, and a coordinate system in the buffer Ai. The buffer Ai is a two-dimensional buffer having a width of W pixels and a height of H pixels. Assume that the buffer Ai is equal in size to a frame. That is, the size of a frame stored in the buffer Ai has a width of W pixels and a height of H pixels. Assume that the coordinates of a pixel (pixel position) at the upper left corner of the buffer Ai (frame) are (0, 0), and the coordinates of a pixel (pixel position) at the lower right corner of the buffer Ai (frame) are (W−1, H−1).

Setting data stored in the setting data area 13*d* will be explained. In the moving image recognition apparatus 10, the operation is switched in accordance with the contents of the setting data. The setting data include variables C1, C2, and C3. The variable C1 is used to switch the timing of output by the output unit 208. The variable C2 is used to switch the operation when labels different in the label recognition result 224 have been detected for the same object. The variable C3 is used to switch the operation when barcodes different in the decoding result 223 have been detected for the same object.

The variables C1, C2, and C3 are stored as the setting data in, e.g., the flash memory unit, and are set together with other data that are written in the flash memory at the time of manufacturing the moving image recognition apparatus according to the present invention.

When output by the output unit 208 is performed after a predetermined time or a predetermined number of frames passed after detection of a barcode, for example, 1 is set in the variable C1. When output by the output unit 208 is performed after a wait until an object including a barcode ceases to be detected, for example, 2 is set in the variable C1. When output by the output unit 208 is performed after a predetermined time or a predetermined number of frames passed after detection of a barcode, or after an object including a barcode ceases to be detected, for example, 3 is set in the variable C1.

When the second warning condition has been established, the warning unit 210 issues a message or warning tone, and the modification input unit 211 prompts the operator to input a modified recognition result, for example, 1 is set in the variable C2. When the second warning condition has been established and the decision unit 212 decides by a majority voting a label type, and a price reduction amount, a discount rate, or the number of points, for example, 2 is set in the variable C2.

When the third warning condition has been established, the warning unit 213 issues a message or warning tone, and the modification unit 214 prompts the operator to modify the decoding content, for example, 1 is set in the variable C3. When the third warning condition has been established and the majority voting unit 215 selects the decoding result 223 by majority voting, for example, 2 is set in the variable C3.

In the above description, the variables C1, C2, and C3 are set at the time of manufacturing. However, the operation of this apparatus may be changed by, for example, extracting the flash memory and setting again these variables by a flash writer.

Next, work data stored in the work data area 13*c* of the storage device 13 will be explained. The work data include an array (array data) E of a predetermined size K. The array E is used to record the presence/absence of a moving object corresponding to a moving object number decided by the object number decision unit 203*a*. When there is a moving object corresponding to a number j, for example, 1 is set as the moving object number in the jth element E[j] of the array E; otherwise, for example, 0 is set in the element E[j].

The work data further include arrays P and Q of the size K. The arrays P and Q are used to store a barcode number and label number corresponding to a moving object number. When there is a moving object of the number j and a barcode exists on the moving object, the number of the barcode is set in the jth element P[j] of the array P; otherwise, for example, 0 is set in the element P[j]. When there is a moving object of the number j and a label exists on the moving object, the number of the label is set in the jth element Q[j] of the array Q; otherwise, for example, 0 is set in the element Q[j].

The work data further include an array d. The array d is used to contain a decoding result corresponding to a barcode number.

The work data further include a variable L, and arrays (array variables) s and t. The variable L is used to represent the number of labels detected by the label recognition unit 205. The arrays s and t are used to store the coordinates of a detected label. The ith elements s[i] and t[i] of the arrays s and t store the X- and Y-coordinates of the ith (i=1, . . . , L) label. Here, the coordinates of the center of a rectangle circumscribing the label are used as the X- and Y-coordinates of the ith label.

The work data further include arrays (array variables) $\alpha$ and $\beta$. The array $\alpha$ is used to store a number representing a label type corresponding to a label number. The number representing a label type is 1 for a discount label, 2 for a discount label, and 3 for a point giving label. The type number of the ith (i=1, . . . , L) label is stored in the ith element $\alpha$[i] of the array $\alpha$. The array $\beta$ is used to store a price reduction amount, a discount rate, or the number of points corresponding to a label number. The price reduction amount, discount rate, or number of points of the ith label is stored in the ith element $\beta$[i] of the array $\beta$.

The work data further include arrays (array variables) E2, P2, d2, $\alpha$2, and $\beta$2. The arrays E2, P2, d2, $\alpha$2, and $\beta$2 are used to hold the contents of the above-mentioned arrays E, P, d, $\alpha$, and $\beta$ before one frame.

The work data further include an array g. The array g is the array of a character string variable representing the decoding result of a barcode detected first for each moving object. When there is a moving object of the number j and a barcode present on the moving object has been detected from a previous frame, the decoding result of a barcode detected first for the moving object is set in the jth element g[j] of the array g; otherwise, for example, a null character string is set in the element g[j].

The work data further include arrays (array variables) h, f, and g2. The array h represents the number of frames preceding a frame in which a barcode was detected first for each moving object. When there is a moving object of the number j and a barcode on the moving object has been detected in a previous frame, a positive integer is set in the jth element h[j] of the array h; otherwise, for example, −1 is set in the element h[j]. When a positive integer is set in h[j], the numerical value h[j] represents the number h[j] of frames preceding a frame in which a barcode on the moving object of the number j was detected.

The array f represents whether a barcode on a moving object has already been output. When a barcode on a moving object of the number j has already been output, for example, 1 is set in the jth element f[j] of the array f; otherwise, for example, 0 is set in the element f[j].

The array g2 represents whether a label has already been detected on a moving object. When there is a moving object of the number j and a label on the moving object has been detected in a previous frame, for example, 1 is set in the jth element g2[*j*] of the array g2; otherwise, for example, 0 is set in the element g2[*j*].

The work data further include the arrays (array variables) $\Lambda$ and $\Gamma$. The array $\Lambda$ is the array of a list (list variable) used to store the list of the recognition results of barcodes detected on moving objects. Each element of the jth list (list variable) $\Lambda$[j] in the list array $\Lambda$ is a structure that stores the decoding result of a barcode detected on a moving object of the number j. The array $\Gamma$ is the array of a list (list variable) used to store the list of the recognition results of labels detected on moving objects. Each element of the jth list (list variable) $\Gamma$[j] in the list array $\Gamma$ is a structure that stores a number representing the type of a label detected on a moving object of the number j, and a price reduction amount, a discount rate, or the number of points. The work data further include arrays (array variables) $\Lambda$2 and $\Gamma$2. The arrays $\Lambda$2 and $\Gamma$2 are used to store the contents of the above-described arrays $\Lambda$ and $\Gamma$ before one frame.

Next, an operation according to this embodiment will be explained by exemplifying moving image recognition processing to be executed by the moving image recognition apparatus 10. First, at the time of activating the moving image recognition apparatus 10, all the elements of the arrays E, P, Q, $\alpha$, $\beta$, d, g, h, f, and g2 in the work data area 13*c* are initialized. More specifically, 0 is set in all the elements of the arrays E, P, Q, $\alpha$, and $\beta$, and null character strings are set in all the elements of the arrays d and g. Also, −1 is set in all the elements of the array h, and 0 is set in all the elements of the arrays f and g2. Similarly, all the elements of the list arrays $\Lambda$, $\Gamma$, $\Lambda$2, and $\Gamma$2 are also initialized. More specifically, empty lists are set in all the elements of the arrays $\Lambda$, $\Gamma$, $\Lambda$2, and $\Gamma$2.

The following remaining description of this embodiment will explain frame processing that is performed by the moving image recognition apparatus 10 according to the embodiment every time the moving image input unit 201 causes the input/output controller 14 to transfer only one frame of the moving image 221 and update the pointers P1 to PN.

In frame processing, the contents of the arrays E, P, d, $\alpha$, $\beta$, $\Lambda$, and $\Gamma$ are copied to the arrays E2, P2, d2, $\alpha$2, $\beta$2, $\Lambda$2, and $\Gamma$2, respectively.

Then, in frame processing, the moving object detection unit 203, the data code reading unit 204, the label recognition unit 205, the association unit 206, the update unit 207, the output unit 208, the warning unit 209, the warning unit 210, the modification input unit 211, the decision unit 212, the warning unit 213, the modification unit 214, and the majority voting unit 215 operate as follows.

To simplify the description, the latest frame stored in a buffer pointed by the pointer P1 will be referred to as a frame F1, a frame that is stored in a buffer pointed by the pointer P2 and stored prior to the latest frame will be referred to as a frame F2.

Then, in frame processing, detection of a moving object from the moving image 221 by the moving object detection unit 203, detection of a barcode from the frame F1 by the data code reading unit 204, and detection and recognition of a label image from the frame F1 by the label recognition unit 205 are performed by a method to be described later.

The moving object detection unit 203 detects a moving object from the moving image 221 stored in the buffer unit 202. The moving object detection unit 203 identifies each detected moving object. Details of the operation of the moving object detection unit 203 will be described below.

The moving object detection unit 203 divides the frame F1 (frame image) into lattice-like small blocks at an interval of Z pixels. For each small block, the moving object detection unit 203 performs so-called block matching to search the frame F2 (frame image) for a region most similar to (i.e., matching) the small block.

Figure 6:
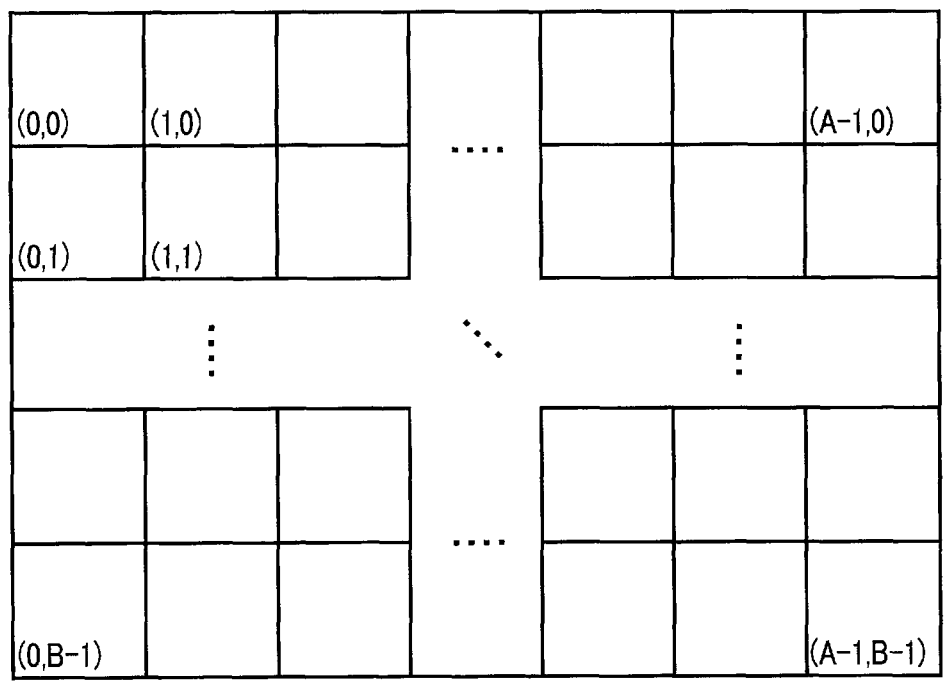
FIG. 6 is a view showing an example of the relationship between a frame and a small block.

FIG. 6 shows an example of the relationship between the frame and the small block. In the example of FIG. 6, the frame is divided into A×B lattice-like small blocks at an interval of Z pixels. That is, the frame is divided into A×B small blocks in a matrix of A columns and B rows. The position of each small block is represented by a column number a and a row number b. The column number a is a number sequentially assigned to each small block in the lateral direction (i.e., the right direction of the frame) by setting a small block at the left end of the frame as the number (=0) of a starting point. The row number b is a number sequentially assigned to each small block in the longitudinal direction (i.e., the down direction of the frame) by setting a small block at the upper end of the frame as the number (=0) of a starting point. For example, the position (a, b) of a small block is (0, 0) at the upper left corner of the frame, and (a, b) is (A−1, 0) in a small block at the upper right corner of the frame. (a, b) is (0, B−1) in a small block at the lower left corner of the frame, and (a, b) is (A−1, B−1) in a small block at the lower right corner of the frame.

Figure 7:
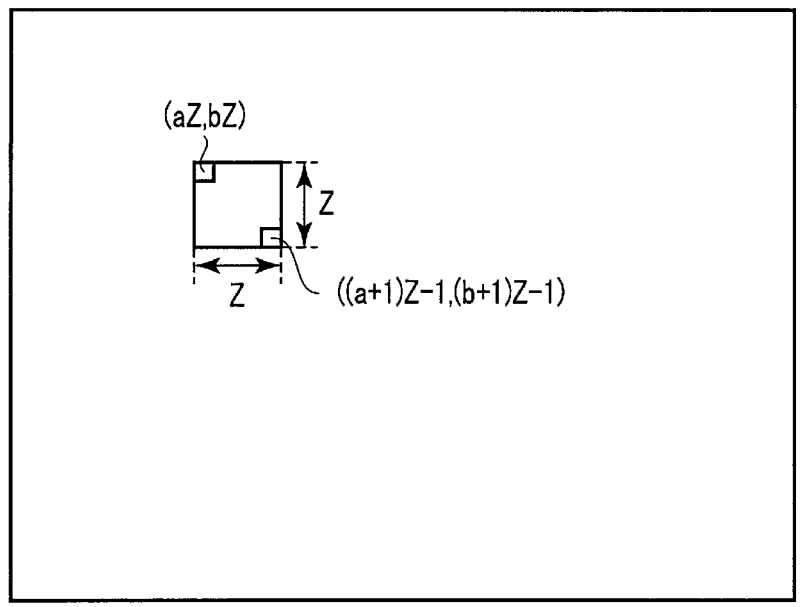
FIG. 7 is a view showing an example of the size and coordinates of a small block in a frame.

FIG. 7 shows an example of the size and coordinates of a small block at the position (a, b) in the frame. Assume that the coordinates of a pixel at the upper left corner of the frame are (0, 0), as shown in FIG. 5. In this case, the coordinates of a pixel at the upper left corner of a small block present at the position (a, b) in the frame are represented by (aZ, bZ), as shown in FIG. 7. The coordinates of a pixel at the lower right corner of this small block are represented by ((a+1)Z−1, (b+1)Z−1), as shown in FIG. 7.

The work data stored in the work data area 13c include two two-dimensional arrays M1 and M2, in addition to various arrays as described above. The two-dimensional arrays M1 and M2 are used to store the number of a moving object for each small block. More specifically, the two-dimensional array M1 is used to store, for each small block, the number of a moving object detected from the frame F1 stored in a buffer pointed by the pointer P1. In contrast, the two-dimensional array M2 is used to store, for each small block, the number of a moving object detected from an immediately preceding frame (frame F2) stored in a buffer pointed by the pointer P2.

Figure 8:
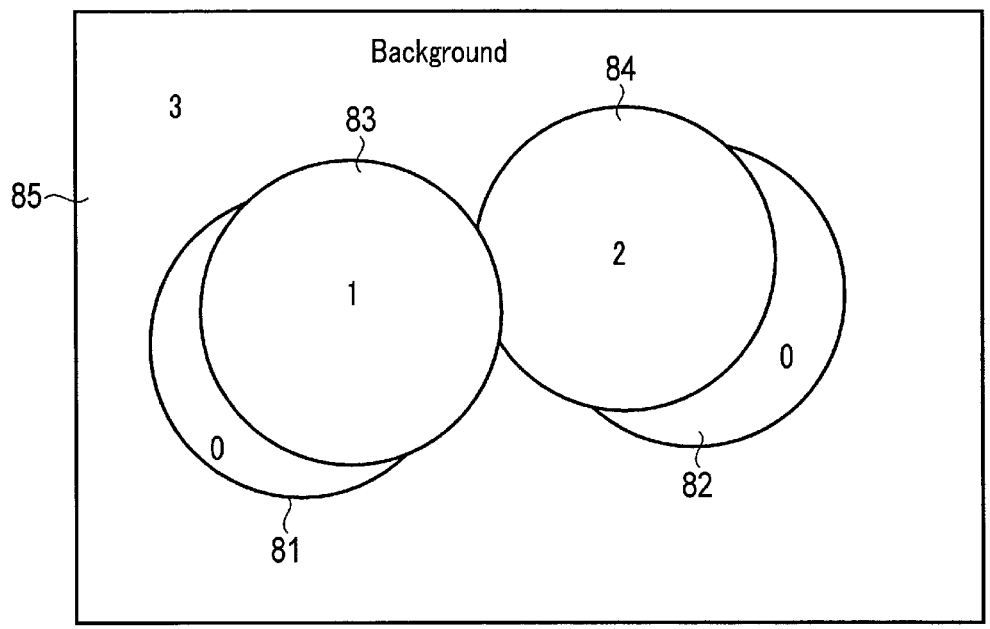
FIG. 8 is a view schematically showing an example of a two-dimensional array that stores the number of a moving object.

FIG. 8 schematically shows an example of the two-dimensional array Mr (r=1, 2) that stores the number of a moving object. In FIG. 8, regions 81 and 82 where a numerical value of 0 is described are sets of elements of the two-dimensional array Mr in which the numerical value of 0 is set. When there is no moving object corresponding to a small block at the position (a, b), 0 is set in an element of the two-dimensional array Mr that corresponds to this small block. Hence, the regions 81 and 82 represent that there is no moving object in sets of small blocks corresponding to the regions 81 and 82. In this embodiment, the moving object detection unit 203 initializes all the elements of the two-dimensional arrays M1 and M2 to 0 at the time of activating the moving image recognition apparatus 10. In the initial state, the two-dimensional arrays M1 and M2 represent that no moving object has been detected. In the following description, a small block at the position (a, b) is sometimes referred to as a small block (a, b).

In FIG. 8, regions 83, 84, and 85 where numerical values of 1, 2, and 3 are described are sets of elements of the two-dimensional arrays Mr in which the numerical values of 1, 2, and 3 are set. When there is a moving object corresponding to a small block (a, b), the number of the moving object is set in an element of the two-dimensional array Mr that corresponds to this small block (a, b). The regions 83, 84, and 85 represent that there are moving objects having numbers of 1, 2, and 3 in sets of small blocks corresponding to the regions 83, 84, and 85. Note that the region 85 corresponds to a background image in a frame. This embodiment assumes that the background image is detected as a moving object.

The moving object detection unit 203 performs block matching based on the frame F1 stored in a buffer pointed by the pointer P1, and the frame F2 stored in a buffer pointed by the pointer P2. That is, the moving object detection unit 203 searches for a region in the frame F2 matching the small block (a, b) for each small block (a, b) in the frame F1.

FIG. 9 shows the state of block matching applied in this embodiment. In the example of FIG. 9, the moving object detection unit 203 searches the frame F2 and checks whether a region in the frame F2 indicated by an arrow 90 matches a small block (a, b) in the frame F1. When a region matching the small block (a, b) in the frame F1 is not detected from the frame F2, the moving object detection unit 203 sets a value of 0 in a variable M. To the contrary, when a matching region is detected, the moving object detection unit 203 sets a value of 1 in the variable M, and sets the X- and Y-coordinates of the upper left corner of this region in variables X[a, b] and Y[a, b]. The variable M and the variables X[a, b] and Y[a, b] are some of the work data.

In the above-described block matching, the moving object detection unit 203 executes the following processing for each combination (x, y) of a candidate x (x=0, . . . , W−Z) of the value (i.e., X-coordinate) of the variable X in the frame F2 and a candidate y (y=0, . . . , H−Z) of the value (i.e., Y-coordinate) of the variable Y in the frame F2. That is, the moving object detection unit 203 superposes a small block (a, b) in the frame F1, and a rectangular region where the coordinates of a pixel at the upper left corner in the frame F2 are (x, y) and the width and height are Z. Then, the moving object detection unit 203 calculates the mean square error of the pixel value. The moving object detection unit 203 sets the calculated mean square error as the cost of matching between the small block (a, b) and the rectangular region (i.e., rectangular region corresponding to the coordinates (x, y) of the combination).

If there are coordinates (x, y) at which the cost becomes equal to or smaller than a predetermined threshold θ, the moving object detection unit 203 determines that a region matching the small block (a, b) has been detected. In this case, the moving object detection unit 203 sets a value of 1 in a variable F[a, b]. The variable F[a, b] is one of the work data. When the variable F[a, b] is 1, this indicates that there is a region matching the small block (a, b). If there are no coordinates (x, y) at which the cost becomes equal to or smaller than the threshold θ, the moving object detection unit 203 determines that a region matching the small block (a, b) ceases to be detected. In this case, the moving object detection unit 203 sets a value of 0 in the variable F[a, b]. This indicates that there is no region matching the small block (a, b). When there are coordinates (x, y) at which the cost becomes equal to or smaller than the threshold θ, the moving object detection unit 203 sets, in the variables (X[a, b] and Y[a, b]), coordinates at which the cost becomes minimum, out of these coordinates (x, y).

The moving object detection unit 203 sets 0 in a corresponding element M1[a, b] in the two-dimensional array M1 for a small block (a, b) for which no matching region has been detected by the block matching, that is, for a small block of F[a, b]=0. The moving object detection unit 203 sets the number of a moving object in the element M1[a, b] for a small block (a, b) for which a matching region has been detected, that is, for a small block of F[a, b]≠0. To do this, the object number decision unit 203a of the moving object detection unit 203 decides the number of the moving object as follows.

Based on the coordinates (X[a, b] and Y[a, b]) obtained by the block matching, the object number decision unit 203a acquires a0 to a2 and b0 to b2:

a0=FLOOR(X[a, b]/Z)
a1=MAX(0, a0−S)
a2=MIN(A−1, a0+S)
b0=FLOOR(Y[a, b]/Z)
b1=MAX(0, b0−S)
b2=MIN(B−1, b0+S)

where FLOOR (ξ) is a function that returns a maximum integer equal to or smaller than ξ, MAX(x, y) is a function that compares arguments x and y and returns a larger one, MIN(x, y) is a function that compares the arguments x and y and returns a smaller one, and S is an arbitrarily predetermined constant.

By referring to the two-dimensional array M2, the object number decision unit 203a determines whether a small block of M2[a, b]≠0 exists in a set of small blocks in the range of a=a1, . . . , a2 and b=b1, . . . , b2. If there is no small block of M2[a, b]≠0, the object number decision unit 203a searches the array E for an element having a value of 0. If an element having a value of 0 is detected, the object number decision unit 203a sets, in M1[a, b] as the number of a moving object corresponding to the small block (a, b), the number of the element having the value of 0 in the array E. In contrast, if an element having a value of 0 does not exist in the array E, the object number decision unit 203a sets 0 in M1[a, b].

If there is a small block of M2[a, b]≠0, the object number decision unit 203a obtains the mode of the number M2[a, b] of the moving object in the set of small blocks of M2[a, b]≠0. The moving object detection unit 203 substitutes the mode into M1[a, b] as the number of the moving object corresponding to the small block (a, b).

After that, the object number decision unit 203a sets 0 in all the elements of the array E. The object number decision unit 203a sets 1 in E[M1[a, b]] for each small block in the range of a=a1, . . . , a2 and b=b1, . . . , b2.

By the above-described series of operations of the moving object detection unit 203 (i.e., the moving object detection unit 203 including the object number decision unit 203a), the moving object detection result 222 is stored in the two-dimensional array M1. However, a moving object may be detected by a method different from that applied in this embodiment as long as a corresponding moving object can be specified for each location equivalent to the small block.

The operations of the data code reading unit 204 and label recognition unit 205 will be explained next.

The data code reading unit 204 detects a barcode from the frame F1. The data code reading unit 204 substitutes the number of detected barcodes into the variable M. For each detected barcode, the data code reading unit 204 sets the X- and Y-coordinates of the center of a rectangle circumscribing the barcode in variables u[i] and v[i]. The variables u[i] and v[i] are some of the work data.

The data code reading unit 204 analyzes the image of each detected barcode to decode (i.e., read) information recorded on the barcode. The data code reading unit 204 substitutes the decoding result 223 into an element (character string variable) d[i] of the array d, in which i is the number used to identify a detected barcode.

The label recognition unit 205 detects and recognizes a label image registered in the label dictionary from the frame F1 by template matching using the label dictionary stored in the label dictionary area 13e of the storage device 13. FIG. 10 schematically shows the typical data structure of a label dictionary applied in this embodiment. As shown in FIG. 10, the label dictionary stores, in advance for each label to be recognized, an image (i.e., a reference image) serving as the reference of the label, a number representing the type of the label, and a price reduction amount, a discount rate, or the number of points.

Assume that the label recognition unit 205 has detected a region matching the reference image from the frame F1 by the above-described template matching. That is, assume that the label recognition unit 205 has detected a label. In this case, for each detected label, the label recognition unit 205 acquires the label recognition result 224 regarding this label. The label recognition result 224 includes a pair of the type (more specifically, a number representing the type) of the detected label, and a price reduction amount, a discount rate, or the number of points. The label recognition result 224 further includes the coordinates of the detected label, e.g., the center coordinates of the label. In this embodiment, the center coordinates of the label are the X- and Y-coordinates of the center of a rectangle circumscribing the label.

The label recognition unit 205 stores the number of detected labels and the acquired label recognition results 224 in the work data area 13c as follows. First, the label recognition unit 205 sets the number of detected labels in the variable L. For each detected label, the label recognition unit 205 sets the X- and Y-coordinates of the center of a rectangle circumscribing the label in the elements (variables) s[i] and t[i] of the arrays s and t, in which i is the number used to identify a detected label, unlike the above-described operation of the data code reading unit 204. For each detected label, the label recognition unit 205 sets a number representing the type of the label in the element α[i] of the array α, and the price reduction amount, discount rate, or number of points of the label in the element β[i] of the array β.

The above-described detection of a moving object from the moving image 221 by the moving object detection unit 203, detection of a barcode from the frame F1 by the data code reading unit 204, and detection and recognition of a label image from the frame F1 by the label recognition unit 205 may be executed sequentially on the same thread, or executed parallel by a plurality of threads or CPU cores, and the execution order of them can be arbitrarily set.

Then, in frame processing, the association unit 206 executes the following association by a method (to be described later) based on the moving object detection result 222 obtained by the moving object detection unit 203, the decoding result 223 obtained by the data code reading unit 204, and the label recognition result 205 obtained by the label recognition unit 205. That is, the association unit 206 checks the positional relationship between the label recognized by the label recognition unit 205, the barcode decoded by the data code reading unit 204, and the moving object detected by the moving object detection unit 203. The association unit 206 associates a label recognition result obtained by recognizing a label on the same object as that of a barcode, with the decoding result of the barcode.

Details of the operation of the association unit 206 will be explained next. First, the association unit 206 initializes all the elements of the arrays P and Q to 0. Then, for each barcode detected by the data code reading unit 204, i.e., for i=1, . . . , M, the association unit 206 acquires a number M1[$u[i]$/Z, v[i]/Z] of a moving object on which the center coordinates (u[i], v[i]) of the barcode are positioned. The association unit 206 sets i in the element P[M1[$u[i]$/Z, v[i]/Z]] of the array P. For each label recognized by the label recognition unit 205, i.e., for i=1, . . . , L, the association unit 206 acquires a number M1[$s[i]$/Z, t[i]/Z] of a moving object on which the center coordinates (s[i], t[i]) of the label are positioned. Thereafter, the association unit 206 sets i in an element Q[M1[$s[i]$/Z, t[i]/Z]] of the array Q.

By the operation of the arrays P and Q by the association unit 206, the association data 225 is stored in the work data area 13c. In this fashion, by the operation of the arrays P and Q, the association unit 206 associates each detected moving object with the decoding result of a barcode detected on the moving object and the recognition result of a label detected on the moving object. As a result, the decoding result of the barcode is associated with the recognition result of the label detected on the object on which the barcode is printed (i.e., the same object). Note that that a surface of the object on which the barcode is printed (i.e., barcode surface), and a surface of the object to which the label is attached need not be the same surface.

Then, in frame processing, the update unit 207 performs the following work data update processing (history update processing) by a method to be described later.

The operation of the update unit 207 will be explained below. Every time association by the association unit 206 is completed, the history update unit 207a of the update unit 207 performs the following work data update processing (history update processing). First, if E[j] is 1 (E[j]=1), P[j] is nonzero (P[j]≠0), and g[j] is a null character string for j=1, . . . , K, the history update unit 207a sets d[P[j]] in g[j] and 0 in f[j], respectively. If E[j] is 0 (E[j]=0), the history update unit 207a sets a null character string in g[j].

If g[j] is not a null character string for j=1, . . . , K, the history update unit 207a increments the h[j] value by one. If g[j] is a null character string, the history update unit 207a sets −1 in h[j]. Further, if E[j] is 1 (E[j]=1) and Q[j] is nonzero (Q[j]≠0) for j=1, . . . , K, the history update unit 207a sets 1 in g2[$j$].

When input of a frame from the moving image 221 by the moving image input unit 201 is performed at a constant time interval, h[j] reaches a predetermined value after a predetermined time because the increment of h[j] in the above-described history update processing is 1 (constant value). Even when input of a frame from the moving image 221 is not performed at a constant interval, h[j] can reach the constant value after the predetermined time as long as the history update unit 207a adjusts the increment of h[j] to be proportional to the time interval between frames.

Every time association by the association unit 206 is completed, the list update unit 207b of the update unit 207 performs work data update processing. In this work data update processing, the list array Λ (i.e., the array Λ of the list of the barcode decoding result 223), and the list array Γ (i.e., the array Γ of the list of the label recognition result 224) are updated. Therefore, the work data update processing to be executed by the list update unit 207b will be called list update processing. The list update processing is performed as follows.

First, if P[j] is nonzero (P[j]≠0) for the moving object number j=1, . . . , K, the list update unit 207b adds the decoding result d[P[j]] to the list Λ[j].

If Q[j] is nonzero (Q[j]≠0) for the moving object number j=1, . . . , K, the list update unit 207b adds, to the list Γ[j], a label recognition result formed from a pair of a type number α[Q[j]] of a label detected on the jth moving object, and a price reduction amount, discount rate, or number of points β[Q[j]].

Then, in frame processing, output of the barcode decoding result 223 and label recognition result 224 by the output unit 208 is performed by a method to be described later.

The operation of the output unit 208 will be explained below. At the timing decided by the value of the variable C1, the output unit 208 outputs together the barcode decoding result 223 and the label recognition result 224 associated with the decoding result 223 by the association data 225 to the POS terminal via the input/output controller 14 and the serial input/output interface 18. This operation of the output unit 208 will be explained in more detail.

First, when C1=2 or C1=3, the output unit 208 determines whether E2[$j$]=1 and E[j]=0 for j=1, . . . , K. That is, the output unit 208 determines whether the jth moving object ceases to be detected at the current frame. Based on the result of this determination, the output unit 208 outputs the first element of the jth list Λ[j] in the list array Λ (i.e., the array Λ of the list of the barcode decoding result 223) via the input/output controller 14 and the serial input/output interface 18 for each jth moving object that ceases to be detected at the current frame.

Then, the output unit 208 determines whether the jth list Γ[j] in the list array Γ (i.e., the array Γ of the list of the label recognition result 224) is an empty list. If the list Γ[j] is not an empty list and there is a label associated with the jth moving object (i.e., a label associated with the barcode), the output unit 208 outputs, via the input/output controller 14 and the serial input/output interface 18, information (i.e., the label recognition result 224) constituted by the type number of a label stored in the first element of the list Γ[j], and a price reduction amount, a discount rate, or the number of points.

FIG. 11 shows an example of an output content when there is no label associated with a barcode. FIG. 12 shows an example of an output content when there is a label associated with a barcode. In FIGS. 11 and 12, "BARCODE=012345678" represents that the decoding result of a barcode is 012345678. In the example of FIG. 12, the label recognition result is expressed as "LABEL=1, 10". "LABEL=1, 10" indicates that the type number of a label is 1 (i.e., the label is a discount label), and the price reduction amount is ¥10.

When C1=1 or C1=3, the output unit 208 determines, based on an arbitrarily predetermined constant (threshold) θ, whether h[j]>θ and f[j]=0 for j=1, . . . , K. That is, the output unit 208 determines whether a predetermined time or a predetermined number of frames have elapsed after a barcode was detected on the jth moving object, and the decoding result 223 of the detected barcode has not been output yet. If the output unit 208 determines as a result of this determination that the decoding result 223 of the barcode has not been output yet, it outputs the first element of the list Λ[j] of the barcode decoding result 223 via the input/output controller 14 and the serial input/output interface 18 for each jth moving object.

The output unit 208 then determines whether the jth list Γ[j] in the list array Γ (i.e., the array Γ of the list of the label recognition result 224) is an empty list. If the list Γ[j] is not an empty list and there is a label associated with the jth moving object (i.e., a label associated with the barcode), the output unit 208 outputs, via the input/output controller 14 and the serial input/output interface 18, information constituted by the type number of a label stored in the first element of the list Γ[j], and a price reduction amount, a discount rate, or the number of points. At this time, the output unit 208 sets 1 in f[j]. Accordingly, it can be prevented to output twice or more the decoding result of a barcode on the same moving object (same object) and the recognition result of a label on the same moving object.

The operations of the warning units 209 and 210 will be explained next. As a state in which the first warning condition is satisfied, the warning unit 209 detects a state in which, when a moving image that has been detected by the moving object detection unit 203 ceases to be detected, and a label has been detected on the moving object, but no barcode has been detected on this moving image. More specifically, for j=1, . . . , K, the warning unit 209 searches for j at which E[j]=0, E2[$j$]=1, g[j]=null character string, and g2[$j$]=1. When such j is detected, the warning unit 209 determines that the first warning condition has been established. In this case, the warning unit 209 outputs a message or warning tone from the loudspeaker 19. This embodiment assumes that a voice message such as "direct the barcode" is used to prompt the operator (or customer) of the POS terminal so as to direct the barcode surface of the merchandise toward the camera 17. However, a message may be constituted by a character string, sent to the POS terminal via the serial input/output interface 18, and displayed on the display screen of the POS terminal.

To the contrary, as a state in which the second warning condition is satisfied, the warning unit 210 detects a state in which labels different in the recognition result have been detected for a single moving object among moving objects detected by the moving object detection unit 203. More specifically, when the number of different elements in the list Γ[j] is two or more, the warning unit 210 determines that the second warning condition has been established. In this case, the warning unit 210 outputs a message or warning tone from the loudspeaker 19. To prevent unnecessarily continuing the state in which the message or warning tone is output from the loudspeaker 19, the above-described determination may be performed as follows based on both the lists Γ[j] and Γ2[$j$]. That is, the warning unit 210 may compare the list Γ2[$j$] of the recognition result of an immediately preceding frame and the list Γ[j] of the current recognition result, and only when a frame in which the number of different elements changes from one to two is detected, determine that the second warning condition has been established.

Next, the operation of the modification input unit 211 will be explained. When C2=1 and the warning unit 210 determines that the second warning condition has been established, the modification input unit 211 obtains input of a modified label recognition result. That is, when labels different in the label recognition result have been detected for a single moving object among moving objects detected by the moving object detection unit 203, the modification input unit 211 requests the operator of the POS terminal to input a modified label recognition result. More specifically, the modification input unit 211 sends the first request message to the POS terminal via the serial input/output interface 18 in order to prompt input of a modified label recognition result. The first request message is displayed on the display screen of the POS terminal.

In accordance with the first request message, the operator of the POS terminal inputs a modified label recognition result by operating the POS terminal. The modified label recognition result includes a pair of a number representing the type of a modified label, and a modified price reduction amount, discount rate, or number of points. The POS terminal sends back, to the moving image recognition apparatus 10 via the serial input/output interface 18, the first response message including the modified label recognition result. The modification input unit 211 receives, via the input/output controller 14, the first response message sent back from the POS terminal. Then, the modification input unit 211 interprets the first response message, thereby acquiring the modified label recognition result, i.e., a pair of a number representing the type of a modified label, and a modified price reduction amount, discount rate, or number of points. The modification input unit 211 replaces the list Γ[j] of the label recognition result of the target object (object having the number j) with a list including only one structure that contains the acquired label recognition result.

FIG. 13 shows an example of the first request message. FIG. 14 shows an example of the first response message. In FIGS. 13 and 14, "OBJECT=1" represents that the number j of a moving object is 1. In FIG. 14, "LABEL=1, 10" indicates that the type number of a label is 1 (i.e., the label is a discount label), and the price reduction amount is ¥10, as in the example of FIG. 12.

To prevent unnecessarily repeating the request to input a modified label recognition result, the warning unit 210 may perform the above-described determination immediately before the output unit 208 outputs a pair of a barcode decoding result and label recognition result regarding the target moving object. Alternatively, the modification input unit 211 may perform the determination at this timing. However, the determination at this timing needs to be performed based on not the number of different elements in Γ[i] but the number of different elements in Γ2[$i$]. That is, it is only necessary to request input of a modified label recognition result when the number of different elements in Γ2[$i$] is two or more.

The operation of the decision unit 212 will be explained next. When C2=2 and the above-mentioned second warning condition has been established, the decision unit 212 decides by a majority voting the type, and a price reduction amount, a discount rate, or the number of points. That is, when C2=2 and labels different in the label recognition result 224 have been detected for a single moving object among moving objects detected by the moving object detection unit 203, the decision unit 212 performs the above-mentioned majority voting. The majority voting is performed at, e.g., the timing immediately before the output unit 208 outputs a barcode decoding result and label recognition result regarding the same object. At this timing, the decision unit 212 decides, as a new label recognition result, a label recognition result that is largest in number in the list Γ2[$i$]. The decision unit 212 sets a list including only this new label recognition result in Γ[i] and Γ2[$i$].

The operation of the warning unit 213 will be explained next. When the number of different elements in the list Λ[j] is two or more, the warning unit 213 determines that the third warning condition has been established. That is, when the number of different elements in the list Λ[j] is two or more, the warning unit 213 determines that the data code reading unit 204 has detected barcodes different in the decoding result 223 for a single moving object among moving objects detected by the moving object detection unit 203. In this case, the warning unit 213 outputs a message or warning tone from the loudspeaker 19. To prevent unnecessarily continuing the state in which the message or warning tone is output from the loudspeaker 19, the above-described determination may be performed as follows based on both the lists Λ[j] and Λ2[j]. That is, the warning unit 213 may compare the list Λ2[j] of the recognition result of an immediately preceding frame and the list Λ[j] of the current recognition result, and only when a frame in which the number of different elements changes from one to two is detected, determine that the third warning condition has been established.

Next, the operation of the modification unit 214 will be explained. When C3=1 and the warning unit 213 determines that the third warning condition has been established, the modification unit 214 obtains input of a modified decoding result. That is, when C3=1 and barcodes different in the decoding result 223 have been detected for a single moving object among detected moving objects (i.e., when the number of different elements in the list Λ[j] is two or more), the modification unit 214 requests the operator of the POS terminal to input a modified decoding result. More specifically, the modification unit 214 sends the second request message to the POS terminal via the serial input/output interface 18 in order to prompt input of a modified decoding result. The second request message is displayed on the display screen of the POS terminal.

In accordance with the second request message, the operator of the POS terminal inputs a modified decoding result (i.e., the decoding result of a single barcode) by operating the POS terminal. The POS terminal sends back, to the moving image recognition apparatus 10 via the serial input/output interface 18, the second response message including the modified decoding result. The modification unit 214 receives, via the input/output controller 14, the second response message sent back from the POS terminal. Then, the modification unit 214 interprets the second response message, thereby acquiring the modified decoding result. The modification unit 214 replaces the list of the barcode decoding result of the target object with a list including only one structure that contains the acquired decoding result.

FIG. 15 shows an example of the second request message. FIG. 16 shows an example of the second response message. In FIGS. 15 and 16, "OBJECT=1" represents that the number j of a moving object is 1. In FIG. 15, "BARCODE=987654321" indicates that the input decoding result is 987654321.

To prevent unnecessarily repeating the request to input a modified decoding result, the warning unit 213 may perform the above-described determination immediately before the output unit 208 outputs a pair of a barcode decoding result and label recognition result regarding the target moving object. Alternatively, the modification unit 214 may perform the determination at this timing. However, the determination at this timing needs to be performed based on not the number of different elements in Λ[i] but the number of different elements in Λ2[i]. That is, it is only necessary to request input of a modified decoding result when the number of different elements in Λ2[i] is two or more.

The operation of the majority voting unit 215 will be explained next. When C3=2 and the above-mentioned third warning condition has been established, the majority voting unit 215 selects a decoding content by majority voting. That is, when C3=2 and barcodes different in the decoding result 223 have been detected for a single moving object among detected moving objects (i.e., when the number of different elements in Γ[j] is two or more), the majority voting unit 215 selects a decoding content by majority voting. The selection of a decoding content by majority voting is performed at, e.g., the timing immediately before the output unit 208 outputs a barcode decoding result and label recognition result regarding the same object. At this timing, the majority voting unit 215 decides, as a new decoding result, a decoding result that is largest in number in the list Λ2[i]. The majority voting unit 215 sets a list including only this new decoding result in Λ[i] and Λ2[i].

According to this embodiment, effects listed below can be obtained.

a) The association unit 206 associates the decoding result of a barcode and the recognition result of a label that have been detected on a single moving object among moving objects detected by the moving object detection unit 203. Even when the barcode and the label (label such as a discount label) are arranged at portions at which they do not fall in the same frame, they can be associated with each other.

b) When a moving object ceases to be detected, and a label has been detected on the moving object, but no barcode on the moving object has been detected, the warning unit 209 generates a message or warning tone to prompt the operator to direct the barcode (barcode surface) to the camera 17 (moving image capturing apparatus). This can decrease the frequency at which the operator forgets to direct the barcode toward the camera 17.

c) When labels different in the recognition result are detected for a single moving object among moving objects detected by the moving object detection unit 203, the warning unit 210 (modification input unit 211) generates a message or warning tone (a message or warning tone to prompt input of a modified label recognition result). This message or warning tone prompts the operator to input a modified label recognition result. It is therefore expected to input correct information about a label (more specifically, correct information represented by a symbol printed on the label). Even if a label recognition error occurs, the adverse effect on calculation of the amount of money or points can be prevented.

d) When labels different in the recognition result are detected for the same object, the decision unit 212 decides a recognition result by a majority voting. This can reduce the influence of a label recognition error.

e) When barcodes different in the decoding result are detected for the same object, the warning unit 213 (modification unit 214) generates a message or warning tone (a message or warning tone to prompt input of a modified decoding result). It is therefore expected to input correct information about a barcode. This can reduce the influence of a barcode decoding error.

f) When barcodes different in the decoding result are detected for the same object, the majority voting unit 215 selects a decoding content by majority voting. This can reduce the influence of a barcode decoding error.

In this embodiment, a barcode (one-dimensional barcode) is applied as a data code. However, another data code, for example, a two-dimensional barcode such as a QR Code® may be applied.

At least one embodiment described above can provide a moving image recognition apparatus and moving image recognition method capable of associating a data code and a label from a moving image even when the data code and the label are arranged not to fall in the same frame.

Although several embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes can be made without departing from the spirit of the invention. The accompanying claims and their equivalents are intended to cover these embodiments or modifications as would fall within the scope and spirit of the inventions.

The invention claimed is:

1. A moving image recognition apparatus comprising:
a moving image input circuit configured to input a moving image;
a buffer circuit configured to store the input moving image;
a moving object detection circuit configured to detect moving objects from the moving image stored in the buffer circuit and identify each of the moving objects;
a data code reading circuit configured to detect a data code from each frame of the moving image and decode the detected data code;
a label recognition circuit configured to detect a label from each frame of the moving image and recognize a symbol printed on the detected label;
an association circuit configured to identify a first moving object on which the decoded data code exists, identify a second moving object on which the recognized label exists, determine whether the first moving object and the second moving object are a same moving object among the identified moving objects based on an identification result by the moving object detection circuit and associate the recognized label on the second moving object with the decoded data code on the first moving object when the first moving object and the second moving object are the same moving object; and
an output circuit configured to output together the decoding result of the data code and the recognition result of the label associated with the decoding result.

2. The moving image recognition apparatus according to claim 1, wherein the output circuit outputs the decoding result of the data code and the recognition result of the label after a moving object including the detected data code ceases to be detected by the moving object detection circuit.

3. The moving image recognition apparatus according to claim 1, further comprising a decision circuit configured to decide the recognition result by a majority voting when different labels are detected as recognition results by the moving object detection circuit for a single moving object.

4. The moving image recognition apparatus according to claim 3, wherein
the label includes one of a discount label on which a symbol representing a price reduction amount is printed, a discount label on which a symbol representing a discount rate is printed, and a point giving label representing the number of points to be given,
the recognition result of the label includes type of the label, and one of the reduction amount, the discount rate, or the number of points, and
the decision circuit decides by a majority voting the type of the label, and one of the reduction amount, the discount rate, or the number of points based on the different recognition results.

5. The moving image recognition apparatus according to claim 1, further comprising a majority voting circuit configured to, when data codes different in the decoding result are detected for a single moving object among the moving objects detected by the moving object detection circuit, select a decoding result by a majority voting.

6. The moving image recognition apparatus according to claim 1, wherein the output circuit outputs the decoding result of the data code and the recognition result of the label after a predetermined time or a predetermined number of frames passed after detecting the data code.

7. The moving image recognition apparatus according to claim 1, wherein the association circuit is configured to associate the recognition result of the label obtained by recognizing the label on the single moving object on which the data code is decoded, with the decoding result of the data code on a single moving object based on a positional relationship between the recognized label, the decoded data code, and the identified moving objects.

* * * * *